(12) United States Patent
K et al.

(10) Patent No.: US 12,299,403 B2
(45) Date of Patent: May 13, 2025

(54) INTELLIGENT ENTITY RELATION DETECTION

(71) Applicant: SAP SE, Walldorf (DE)

(72) Inventors: Prajesh K, Mattanur (IN); Prateek Bajaj, New Delhi (IN)

(73) Assignee: SAP SE, Walldorf (DE)

( * ) Notice: Subject to any disclaimer, the term of this patent is extended or adjusted under 35 U.S.C. 154(b) by 323 days.

(21) Appl. No.: 17/969,111

(22) Filed: Oct. 19, 2022

(65) Prior Publication Data

US 2024/0135111 A1    Apr. 25, 2024
US 2024/0232542 A9    Jul. 11, 2024

(51) Int. Cl.
*G06F 40/40* (2020.01)
*G06F 40/295* (2020.01)
*G06F 40/30* (2020.01)

(52) U.S. Cl.
CPC ............ *G06F 40/40* (2020.01); *G06F 40/295* (2020.01); *G06F 40/30* (2020.01)

(58) Field of Classification Search
USPC ..................................................... 704/1–504
See application file for complete search history.

(56) References Cited

U.S. PATENT DOCUMENTS

| | | | | |
|---|---|---|---|---|
| 7,930,322 | B2* | 4/2011 | MacLennan | G06F 16/211 707/804 |
| 11,290,564 | B1* | 3/2022 | Liu | G06N 3/08 |
| 11,295,078 | B2* | 4/2022 | Turek | G06F 40/30 |
| 11,397,859 | B2* | 7/2022 | Fox | G06N 3/045 |
| 11,561,987 | B1* | 1/2023 | Sager | G06F 16/906 |
| 11,650,073 | B2* | 5/2023 | Skupin | G06F 18/22 706/45 |
| 12,061,612 | B1* | 8/2024 | Sager | G06F 40/205 |
| 2009/0300043 | A1* | 12/2009 | MacLennan | G06F 16/211 707/999.102 |
| 2017/0228654 | A1* | 8/2017 | Skupin | G06F 16/22 |
| 2018/0246883 | A1* | 8/2018 | Wang | G06F 17/18 |
| 2019/0180175 | A1* | 6/2019 | Meteer | G10L 15/26 |
| 2019/0347282 | A1* | 11/2019 | Cai | G06N 5/022 |
| 2019/0384812 | A1* | 12/2019 | Turek | G06F 40/30 |
| 2020/0251111 | A1* | 8/2020 | Temkin | G06F 16/2423 |
| 2020/0394455 | A1* | 12/2020 | Lee | G06N 20/00 |
| 2021/0073336 | A1* | 3/2021 | Fox | G06N 3/084 |
| 2022/0188700 | A1* | 6/2022 | Khavronin | G06Q 30/0201 |

(Continued)

*Primary Examiner* — Marcus T Riley
(74) *Attorney, Agent, or Firm* — SCHWEGMAN LUNDBERG & WOESSNER, P.A.

(57) ABSTRACT

Example methods and systems are directed to determining topics of data objects. A machine learning model may be trained and used to determine topics of data objects. After topics for data objects are determined by the trained machine learning model, data objects having similar topics can be automatically related. A semantic web approach relies upon the metadata of the data objects being generated along with the metadata of the insights being generated (such as topic groups). Such a semantic association between various objects (using metadata) forms a metadata driven network of analytical representation of business entities/objects. A datastream comprising the semantic web, indicating the relationships between the metadata of the data objects and the metadata for the topics, may be pushed continuously into a central tool or repository to allow users to generate seamless analytical dashboards with minimal efforts.

20 Claims, 10 Drawing Sheets

(56) References Cited

U.S. PATENT DOCUMENTS

| | | | |
|---|---|---|---|
| 2022/0321672 A1* | 10/2022 | Liu ........................ | G06N 20/00 |
| 2024/0135111 A1* | 4/2024 | K ............................ | G06F 40/40 |
| 2024/0232542 A9* | 7/2024 | K ........................... | G06F 40/284 |
| 2024/0303437 A1* | 9/2024 | Kraus ..................... | G06F 40/30 |

* cited by examiner

*500*

| REQUEST TABLE | | |
|---|---|---|
| REQUEST ID | SUBJECT | BODY |
| 123 | DATABASE ERROR | MY DATABASE QUERY FAILS, RETURNING RESPONSE CODE X13 |
| 124 | CAN'T LOGIN | THE SERVER SAYS THAT MY USERNAME IS NOT IN THE SYSTEM |
| 125 | ORDER TROUBLE | WHEN I TRY TO SAVE A NEW ORDER, IT TELLS ME I DON'T HAVE ACCESS |

| MAPPING TABLE | | |
|---|---|---|
| WORD | WORD ID | VECTOR |
| DATA | 1 | (0, 0.1, 0, 0.2, ...) |
| LOGIN | 2 | (0.1, 0, 0.15, ...) |
| SERVER | 3 | (0, 0, 0.1, 0.1, ...) |

| CLASSIFICATION TABLE | |
|---|---|
| REQUEST ID | TOPIC |
| 123 | CONNECTION |
| 124 | FUNCTIONALITY |
| 125 | BUSINESS |

*FIG. 5*

INTELLIGENT ENTITY RELATION DETECTION

TECHNICAL FIELD

The subject matter disclosed herein generally relates to machine learning. Specifically, the present disclosure addresses systems and methods to use unlabeled data objects to identify relationships among the data objects.

BACKGROUND

Machine learning models are applications that provides computer systems the ability to perform tasks, without explicitly being programmed, by making inferences based on patterns found in the analysis of data. Machine learning explores the study and construction of algorithms, also referred to herein as models, that may learn from existing data and make predictions about new data. The dimensions of the input data are referred to as features.

BRIEF DESCRIPTION OF THE DRAWINGS

Some embodiments are illustrated by way of example and not limitation in the figures of the accompanying drawings.

FIG. 5 is a block diagram of a database schema, according to some example embodiments, suitable for use in determining topics of data objects.

DETAILED DESCRIPTION

Figure 1:
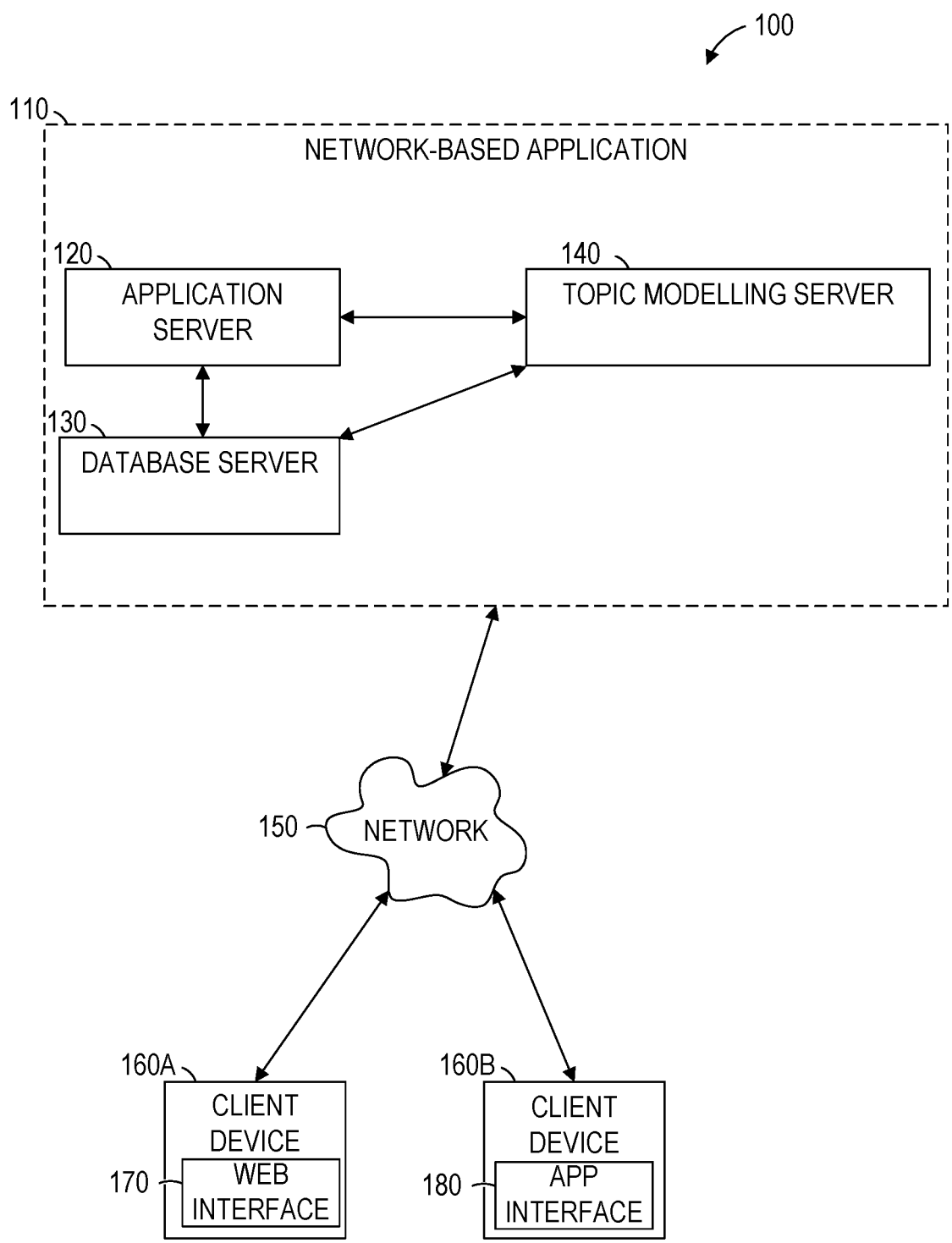
FIG. 1 is a network diagram illustrating a network environment suitable for automatically relating data objects, according to some example embodiments.

Example methods and systems are directed to determining topics of data objects. As used herein, the term data object returns to any computer-processed item of data (e.g., a simple data type such as character, integer, float, or double, a structure comprising multiple simple data types or structures, a human-readable document, or any suitable combination thereof). For example, emails may have business, personal, or advertising topics. As another example, support tickets submitted to a technical support department may have connection issue, functionality issue, or business issue topics. Other examples include determining topics of academic papers such as science and literature; determining legal topics of court cases; and determining topics of movie scripts. As used herein, the word document refers to a collection of text in any machine-readable format. Example documents include word processing files, emails, academic papers, court cases, books, scripts, text submitted through web-based forms, chat messages, and so on.

The model is trained using a training set. Each element of the training set is an input for the machine learning model (e.g., an input data object). By processing the training set, the internal variables of the machine learning model are adjusted so that the error rate of the machine learning model is minimized. If the training set is large and representative of data not included in the training set, the trained model will have comparable results on other data.

Applications receive requests from users. For example, customer service systems receive customer service requests from users. A user request includes text, such as a title or subject and a message body. Processing of the request may be based on a topic of the request. For example, a customer service request is routed to a customer service agent based on a topic of the request. Continuing with this example, a request for help connecting to a system may be routed to a different agent than a request regarding a particular function provided by the system.

A mapping of words to vectors is performed to convert data from human-readable text to a form usable by a machine learning model. However, there is no fixed mapping that is suitable for all applications. Thus, learning the mapping to be used is often part of training a machine learning model that operates on text input.

Many types of data objects include multiple fields of text. For example, an academic paper includes a title, an abstract, and a body. As another example, support tickets and emails include a subject and a body. Books and scripts include titles and bodies. Court cases include a caption, a body, and sometimes a syllabus.

After the topics of the data objects are determined, data objects having similar topics can be automatically related. For example, multiple service requests have the same topic (e.g., concern the same problem). In response, the service requests may be marked as related in a database. A service request allocation system may allocate all of the related service requests to the same service technician, allowing for greater efficiency as the service technician develops expertise in addressing the problem.

When these effects are considered in aggregate, one or more of the methodologies described herein may obviate a need for certain efforts or resources that otherwise would be involved in determining topics of data objects. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating a network environment 100 suitable for automatically relating data objects, according to some example embodiments. The network environment 100 includes a network-based application 110, client devices 160A and 160B, and a network 150. The network-based application 110 is provided by application server 120 in communication with a database server 130 and a topic modelling server 140. The application server 120 accesses application data (e.g., application data stored by the database server 130) to provide one or more applications to the client devices 160A and 160B via a web interface 170 or an application interface 180. For example, the application server 120 may provide a support application that receives help requests from the client devices 160, routes each help request to a service account based on the content of the help request, receives responses from the service accounts, and sends the response to each help request to the requesting client device 160.

The application server 120, the database server 130, the topic modelling server 140, and the client devices 160A and 160B may each be implemented in a computer system, in whole or in part, as described below with respect to FIG. 11. The client devices 160A and 160B may be referred to collectively as client devices 160 or generically as a client device 160.

The topic modelling server 140 accesses training data from the database server 130. Using the training data, the topic modelling server 140 trains a machine learning model that is used by the application server 120. Continuing with the example of a support application, the application server 120 may use the trained machine learning model to determine the topic of each help request. Thus, each help request can be automatically routed to the service account based on the topic provided by the machine learning model instead of having a human read the help request and make a judgment as to which service account is correct. In this way, routing is faster and less expensive.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the topic modelling server 140, and the client devices 160A-160B are connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
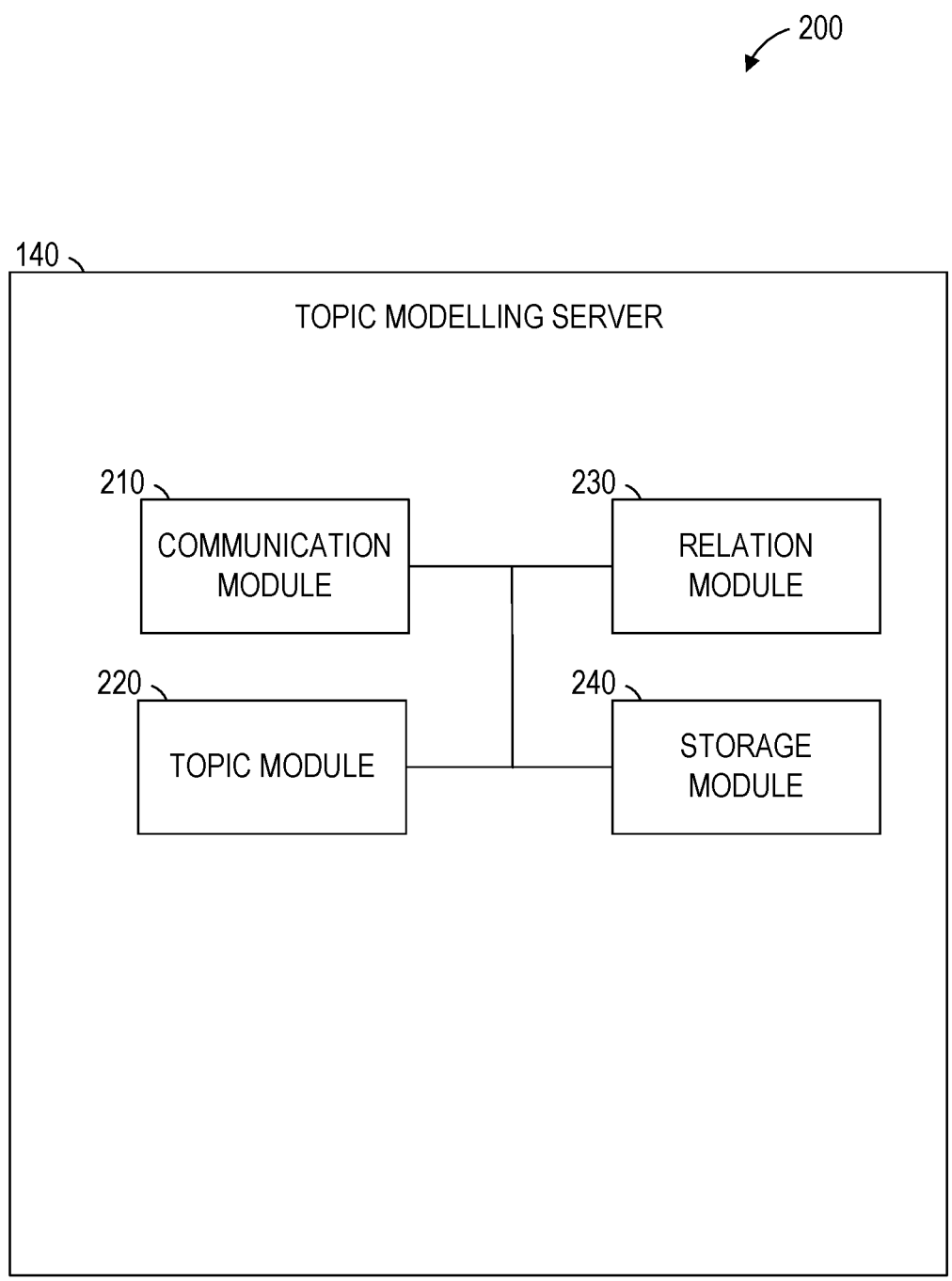
FIG. 2 is a block diagram of a topic modelling server, according to some example embodiments, suitable for determining topics of data objects, according to some example embodiments.

FIG. 2 is a block diagram 200 of a topic modelling server 140, according to some example embodiments, suitable for determining the topic of data objects, according to some example embodiments. The topic modelling server 140 is shown as including a communication module 210, a topic module 220, a relation module 230, and a storage module 240, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the topic modelling server 140 and transmits data from the topic modelling server 140. For example, the communication module 210 may receive, from the application server 120 or the database server 130, unlabeled data objects for topic modelling. Unlabeled data objects may be processed by the topic module 220 to determine a topic for each data object. For example, the data objects may be provided as inputs to a machine learning model that generates a topic as an output. As another example, text of the data objects may be processed using NLP to determine the topics. As still another example, text of each data object may be converted to a vector representation and then the vector representation provided to a trained machine learning model to generate a topic for the data object. The results may be stored in the database of the database server 130 via the storage module 240. Communications sent and received by the communication module 210 may be intermediated by the network 150.

The relation module 230 may operate on two or more data objects that are in the same topic to create relations between the data objects. For example, the application server 120 may receive a request for all data objects having a topic and, by use of the database server 130 and the relation module 230, the requested data objects are identified and provided via the network 150.

The storage module 240 may store data locally on the topic modelling server 140 (e.g., in a hard drive) or store data remotely. Examples of remote storage include network storage devices and the database server 130.

Figure 3:
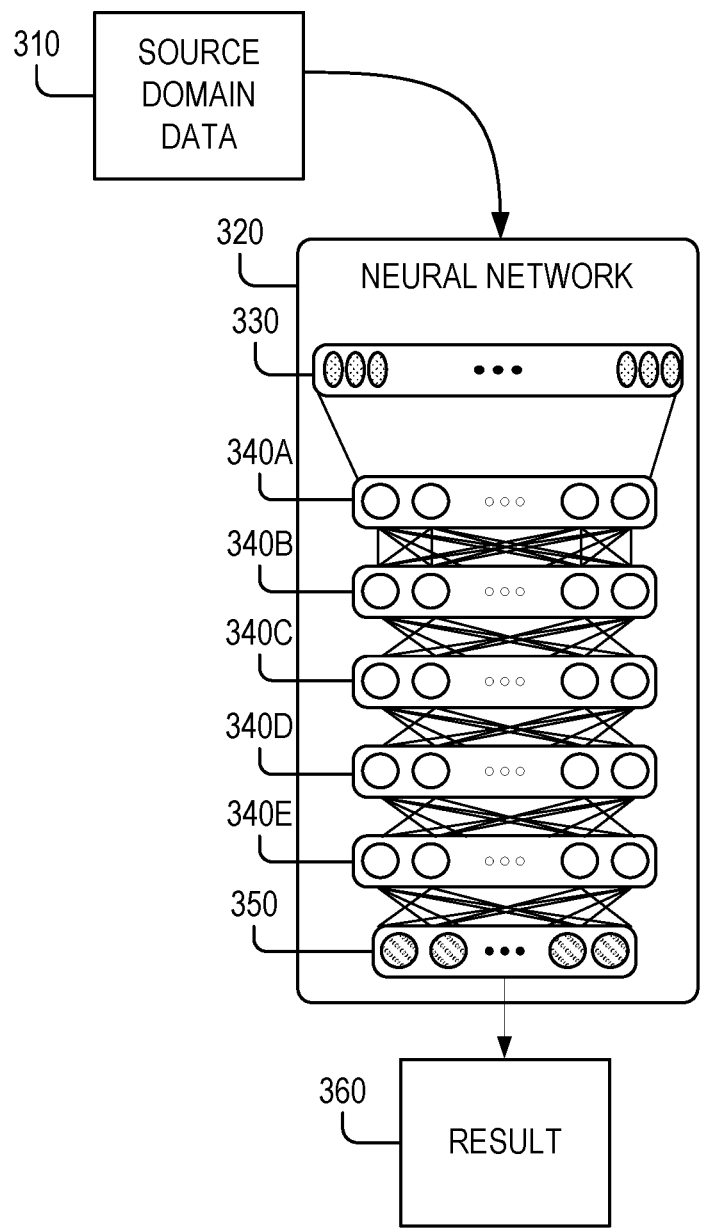
FIG. 3 is a block diagram of a neural network, according to some example embodiments, suitable for use in determining topics of data objects.

FIG. 3 illustrates the structure of a neural network 320, according to some example embodiments. The neural network 320 takes source domain data 310 as input, processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 340 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. In some example embodiments, the number of epochs is 10, 100, 500, or 1000. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the networked trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. In some example embodiments, the inputs are weighted and summed, with the result compared to a threshold to determine if the neuron should generate an output signal (e.g., a 1) or not (e.g., a 0 output). The inputs of the component neurons are modified through the training of a neural network. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input. Thus, the coefficients assign significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like.

With the help of natural language processing (NLP) and advanced data pre-processing, a machine learning model (e.g., the neural network 320) can be trained on all historical (existing) business entities (for instance, incidents, email interactions, etc.) from the system to assign them with a certain set of keywords or a dominant topic label based on textual fields such as description, subject, and so forth.

A topic label can be a human readable phrase or word specific to the industry that it belongs to. It can be determined based on a set of keywords. For instance, if an object contains a long text of multiple words, this model will detect the most "relevant" and "important" keywords and assign them to different ensembles based on multiple factors. Some factors include feature importance and linguistic proximity. Feature importance is an NLP technique used to determine the most important and relevant textual fields provided from an input. Linguistic proximity refers to a distance between vector representations of keywords in two (or more) textual inputs. Additional factors include word commonalities, n-gram commonalities, and the like.

Related data objects may be assigned a human-legible "topic." Based on the existing topics and the contents of a new data object, the new data object is automatically assigned to one of the existing topics.

Figure 4:
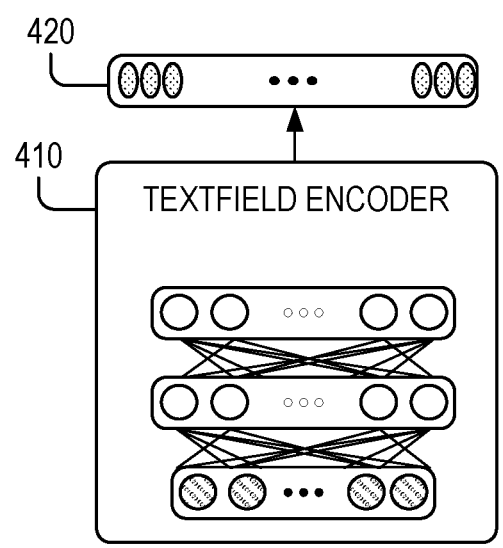
FIG. 4 is a block diagram of a neural network, according to some example embodiments, suitable for use in generating word vectors.

FIG. 4 is a block diagram of a textfield encoder 410, according to some example embodiments, suitable for use in generating word vectors. The textfield encoder 410 generates resulting vector 420. The textfield encoder 410 is trained so that the distance (or loss) function for two related text fields is reduced or minimized.

The specific architecture of the textfield encoder 410 may be chosen dependent on the type of input data for an embedding layer that is followed by some encoder architecture that creates a vector from the sequence. Embeddings and encoder parameters are shared between the text fields. In the simplest case, the encoder stage is just an elementwise average of the token embeddings.

Alternatively, the encoding may include converting pairs of words of the text to bigram vectors and combining the bigram vectors to generate a vector for the text. For example, the text "Database Error" (the subject of the service request of the row 530A of FIG. 5) may have a corresponding vector as a bigram, rather than two separate vectors for "Database" and "Error" that are combined. The text "My database query fails, returning response code X13" may be converted to vectors for each of the bigrams "my database," "database query," "query fails," "fails returning," "returning response," "response code", and "code X13." The vector for a text field may be determined as an average of the bigram vectors for the bigrams in the text field.

In some example embodiments, the word vectors are normalized so that each word vector has a magnitude of one. A vector for text comprising multiple words may be obtained by averaging the vectors of the words in the text. To determine the difference between two vectors, the Euclidean distance formula may be used, taking the square root of the sum of the squares of the differences of corresponding elements of the two vectors.

FIG. 5 is a block diagram of a database schema 500, according to some example embodiments, suitable for use in determining the topic of data objects. The database schema 500 includes a request table 510, a mapping table 540, and a classification table 570. The request table 510 includes rows 530A, 530B, and 530C of a format 520. The mapping table 540 includes rows 560A, 560B, and 560C of a format 550. The classification table 570 includes rows 590A, 590B, and 590C of a format 580.

The format 520 of the request table 510 includes a request identifier field, a subject field, and a body field. Each of the rows 530A-530D stores data for a single service request. The request identifier is a unique identifier for the request. For example, when a service request is received, the application server 120 may assign the next unused identifier to the received service request. The subject and the body of the service request are two text fields with different, but related, text. For example, the subject of the request 123 (in the row 530A) is "Database Error" while the body of the request, "My database query fails, returning response code X13" contains more detailed information about the database error.

The format 550 of the mapping table 540 includes a word, a scalar word identifier for the word, and a vector that is mapped to the word. In some example embodiments, the word vector is in a high-dimensional space (e.g., includes one hundred or more dimensions). Accordingly, only a portion of each vector is shown in FIG. 5. The contents of the mapping table 540 may be created by the topic modelling server 140 of FIG. 1 using the data in the request table 510 as input to the neural network 320 of FIG. 3.

Each of the rows 590A-590C of the classification table 570 includes a request identifier and a topic field, as indicated by the format 580. The request identifier corresponds to the request identifier of one of the rows 530A-530C. The topic field indicates the topic of the corresponding request. The topic may be generated by determining an average word vector for the request and providing the average word vector as an input to the neural network 320, which generates a topic as an output. Alternatively, a sequence of vectors, one for each word in the request, may be provided to the neural network 320. The output generated by the neural network 320 after receiving the last word vector may be used as the topic.

Figure 6:
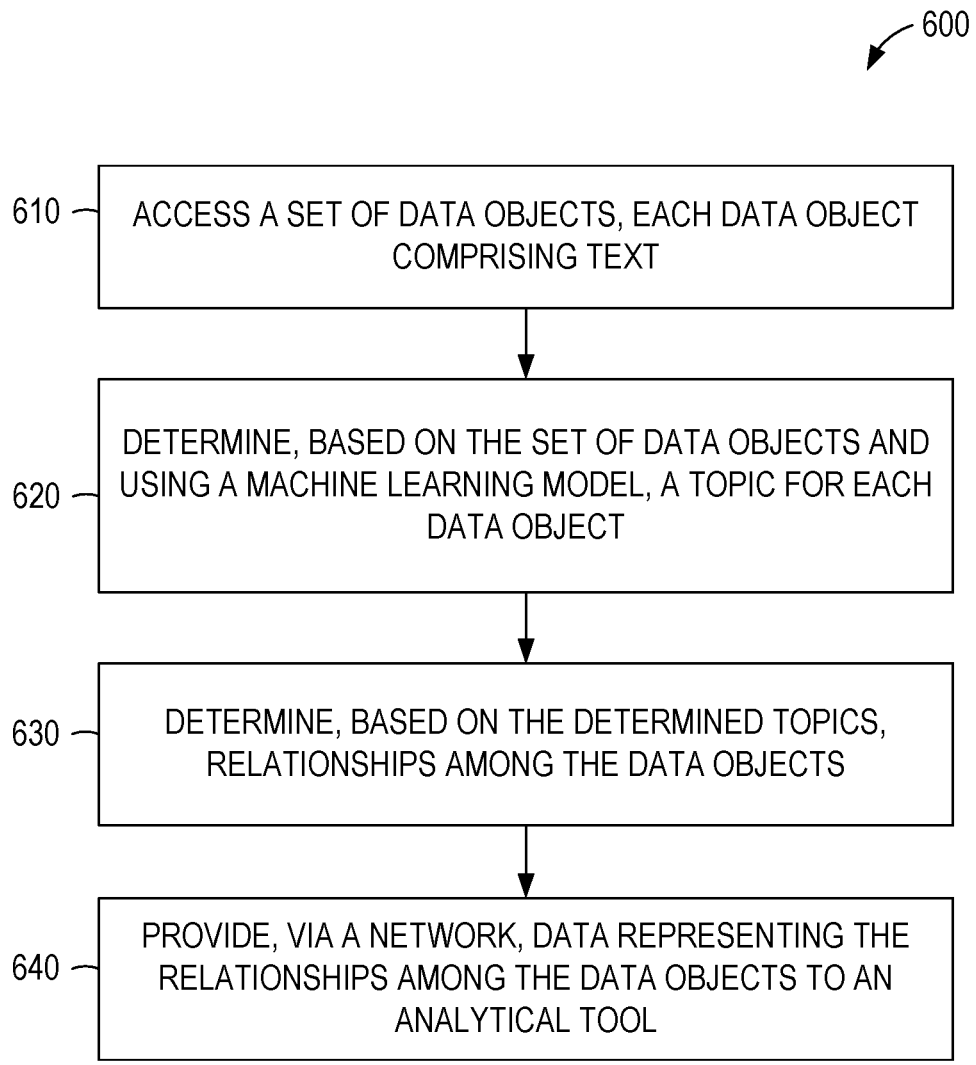
FIG. 6 is a flowchart illustrating operations of a method suitable for determining topics of data objects using a machine learning model and identifying relationships among the data objects, according to some example embodiments.

FIG. 6 is a flowchart illustrating operations of a method 600 suitable for determining the topic of data objects using a machine learning model and identifying relationships among the data objects, according to some example embodiments. The method 600 includes operations 610, 620, 630, and 640. By way of example and not limitation, the method 600 may be performed by the application server 120 and the topic modelling server 140 of FIG. 1, using the modules, databases, and structures shown in FIGS. 2-5.

In operation 610, the topic modelling server 140 accesses a set of data objects, each data object comprising text. For example, the application server 120 may, as an ordinary part of providing an application to the client devices 160, store text in a database hosted by the database server 130. The topic modelling server 140 may periodically access the database to retrieve the text. In many applications, the data used by the application server comprises two separate text fields, such as a title and a body of a service request, email, or other document. Thus, at least a subset of the set of data objects may represent service requests.

The topic modelling server 140, in operation 620, determines, based on the set of data objects and using a machine learning model, a topic for each data object. For example, the retrieved text for a data object may be provided as input to a NLP (e.g., the textfield encoder 410 of FIG. 4) and the resulting vectors provided as input to the neural network 320 of FIG. 3 to generate a topic for the data object. As another example, the text of the data objects may be provided to a trained machine learning model that receives the text as input and generates a topic as an output. Before beginning the method 600, the machine learning model may be trained using labeled data objects.

In operation 630, the topic modelling server 140 determines, based on the determined topics, relationships among the data objects. For example, data objects having the same topic may be related.

The topic modelling server 140 may provide data representing the relationships among the data objects to an analytical tool (operation 640). For example, the application server 120 may provide an analytical tool that makes use of the determined relationships to identify patterns in the data objects or outliers in the data objects. Information regarding the patterns or outliers may be presented on a user interface of the client devices 160.

Figure 7:
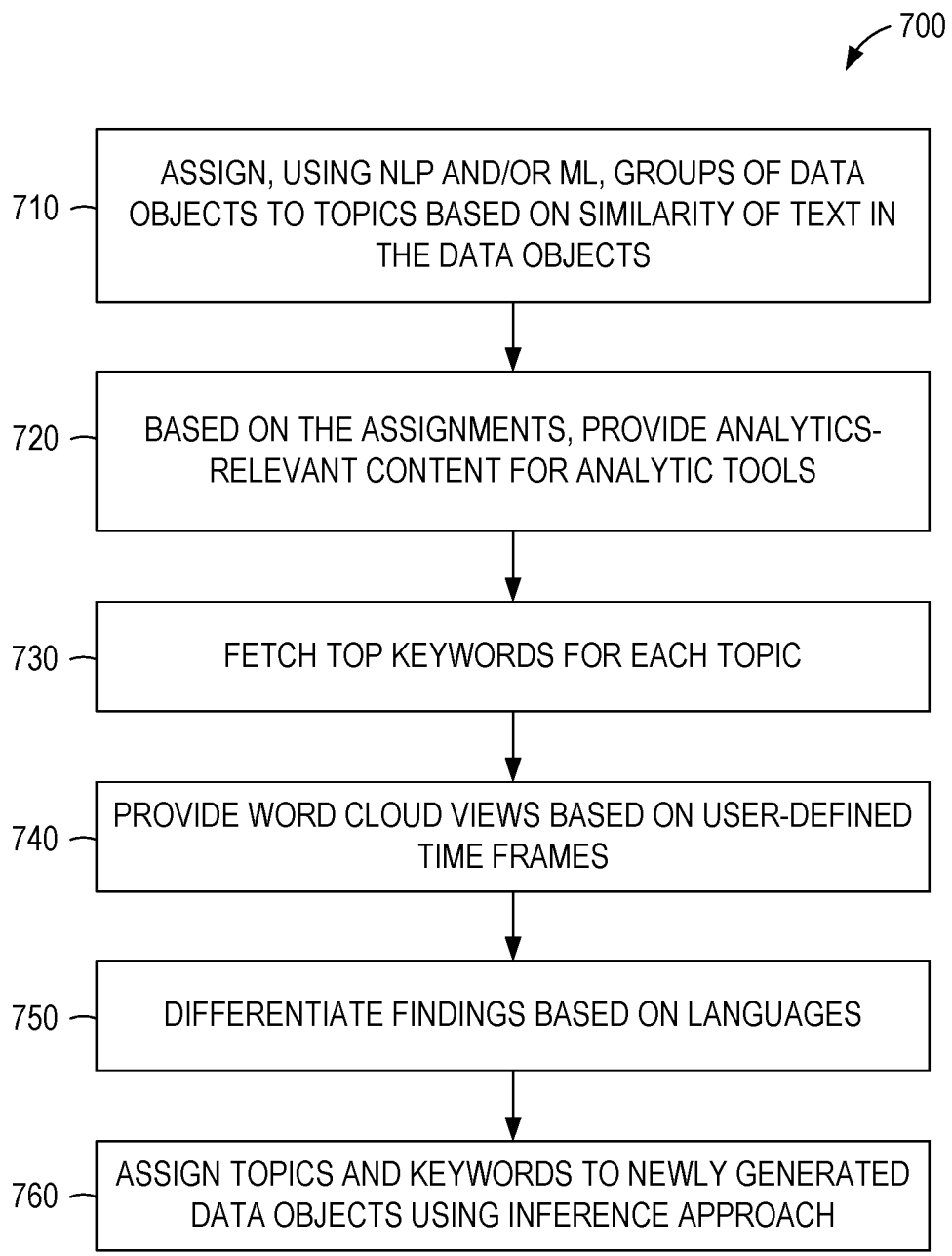
FIG. 7 is a flowchart illustrating operations of a method suitable for determining topics of data objects using a machine learning model and identifying relationships among the data objects, according to some example embodiments.

FIG. 7 is a flowchart illustrating operations of a method 700 suitable for determining the topic of data objects using a machine learning model and identifying relationships among the data objects, according to some example embodiments. The method 700 includes operations 710, 720, 730, 740, 750, and 760. By way of example and not limitation, the method 700 may be performed by the application server 120 and the topic modelling server 140 of FIG. 1, using the modules, databases, and structures shown in FIGS. 2-5.

Latent Dirichlet Allocation (LDA) may be used as a topic model. LDA may be used to group top keywords from a large sample dataset (e.g., a dataset comprising more than 1,000 data objects). Specific pre-processing of the dataset may be performed for each language (e.g., English, German, and Chinese). NLP may be used along with techniques such as feature importance and n-grams.

Historical data (e.g., of incidents or support tickets) is loaded from the application server 120 or the database server 130. The historical data is pre-processed by removing common language-specific stop-words from the text. Additionally, bigrams and trigrams may be created with the most commonly occurring word groupings, and language-specific differentiations between word corpuses are compiled into dictionaries to be used as the input for model training. The language-specific dictionaries may be provided to the LDA model, which trains and generates language-specific models.

In operation 710, the topic modelling server 140 assigns, using NLP and/or machine learning, groups of data objects to topics based on similarity of text in the data objects. The text of each data object is provided as an input to the trained machine learning model and the model may generate as output one or more JavaScript Object Notation (JSON) objects comprising a list of topics and their corresponding keywords and a list of data objects and the corresponding dominant topic for each data object.

Based on the assignments of groups of data objects to topics, the topic modelling server 140 provides analytics-relevant content for analytic tools to the application server 120 (operation 720). For example, the topic information for one or more data objects generated in operation 710 may be provided along with data objects requested by the application server 120. As another example, all data objects assigned to the same topic may be provided to the application server 120 in response for a request from the application server that identifies the topic. As still another example, the number of data objects assigned to one or more topics may be provided to the application server 120 (e.g., data indicating that topics have been determined for fifty data objects relating to "software crash" and twenty data objects relating to "rude employee").

In operation 730, the topic modelling server 140 fetches the top keywords for each topic. The application server 120, based on data generated by the topic modelling server 140, provides word cloud views based on user-defined time frames, in operation 740. The findings are differentiated based on languages (operation 750).

To derive "trending topics" for a particular date range, the following process is followed. Step 1 involves a complete data traversal of each data object and assigning a "dominant topic" to it. This is achieved by feeding each data object of the dataset into the trained model and then returning a metric known as "dominant topic," which is one of the derived topics (from initial training of the model). Topics and keywords are assigned to newly generated data objects using an inference approach (operation 760).

Once such topics are assigned to all the existing records and inference happens for new records, semantic webs of business entities for analytic tools are generated. By way of example, consider a service/support system that contains a set of already existing tickets/incidents (e.g., thousands of data objects). Now, also consider the aforementioned approach applied to each such ticket to assign a topic to it. Now, with each new data object (such as a "ticket") being generated, a topic would be assigned to it using inference. But there is still a restriction of how such data can be combined to create insights for analytic tools. An "insight" is additional data for the data object that was not included in the data object when the data object was received by the topic modelling server 140.

Figure 8:
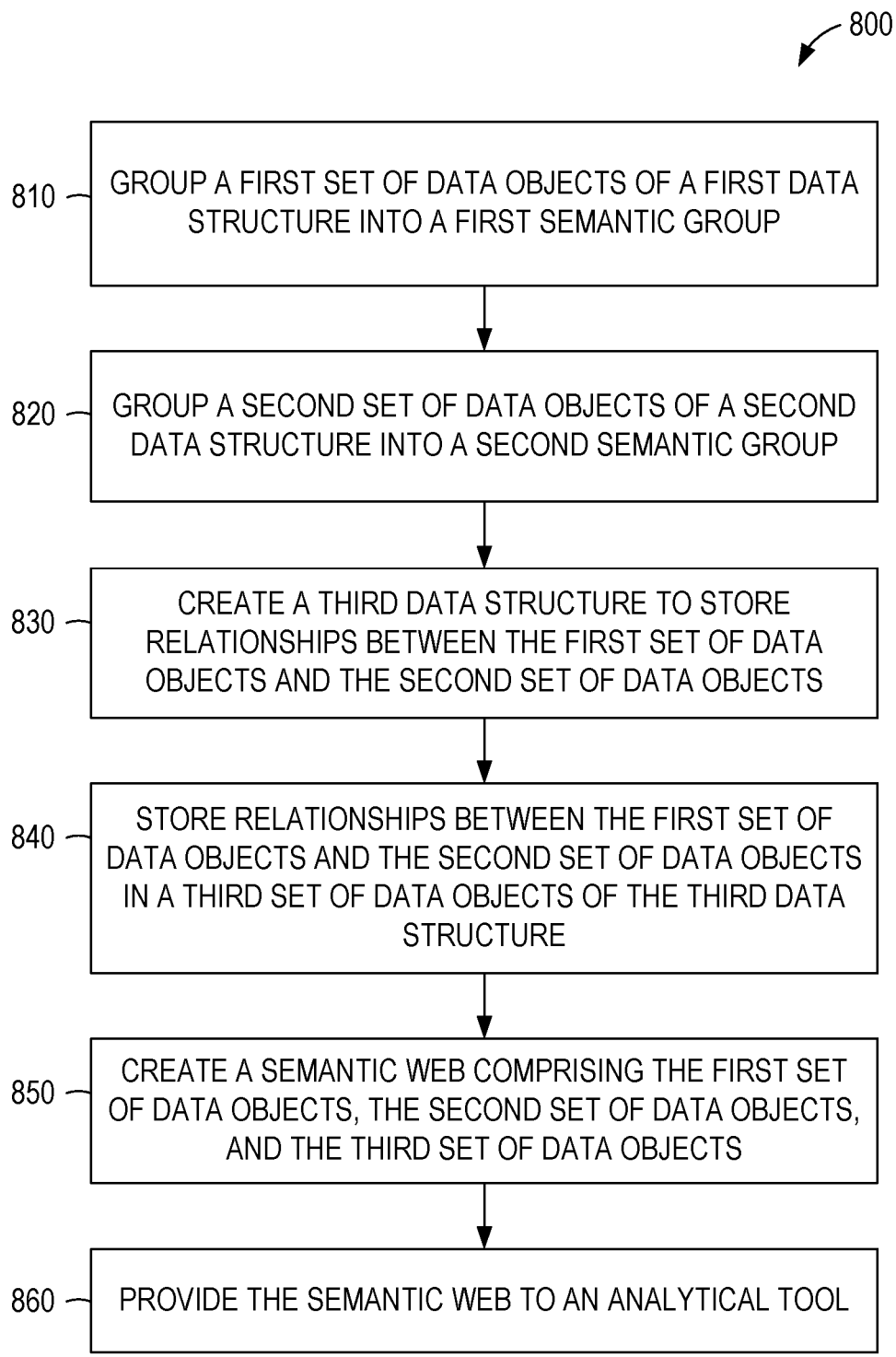
FIG. 8 is a flowchart illustrating operations of a method suitable for determining topics of data objects using a machine learning model and identifying relationships among the data objects, according to some example embodiments.

FIG. 8 is a flowchart illustrating operations of a method 800 suitable for determining the topic of data objects using a machine learning model and identifying relationships among the data objects, according to some example embodiments. The method 800 includes operations 810, 820, 830, 840, 850, and 860. By way of example and not limitation, the method 800 may be performed by the application server 120 and the topic modelling server 140 of FIG. 1, using the modules, databases, and structures shown in FIGS. 2-5.

A semantic web approach relies upon the metadata of the data objects being generated along with the metadata of the insights being generated (such as topic groups). Such a semantic association between various objects (using metadata) forms a metadata driven network of analytical representation of business entities/objects.

A data-stream comprising the semantic web, indicating the relationships between the metadata of the data objects and the metadata for the topics, may be pushed continuously into a central tool or repository to allow users to generate seamless analytical dashboards with minimal efforts.

This can be accomplished with the help of such a semantic web as follows:

In operation 810, the topic modelling server 140 groups a first set of data objects of a first data structure into a first semantic group. For example, all relevant (historical as well as new) tickets generated in the systems can be grouped as Data Source 1, and the semantic definition of this data source can be termed as "Semantic Group 1."

In operation 820, the topic modelling server 140 groups a second set of data objects of a second data structure into a second semantic group. For example, all newly generated topics for historical data as well as newly created data can be grouped as Data Source 2, and the semantic definition of this data source can be termed as "Semantic Group 2."

The topic modelling server 140 creates, in operation 830, a third data structure to store relationships between the first set of data objects and the second set of data objects. For example, a "semantic link" is created between the two groups, such that changes in either one reflects in the other, if linked either way. Such a link is responsible for generating a seamless connection between further changes in the actual data.

The semantic definitions, and in turn these semantic links, can be pushed through a central gateway allowing and linking a seamless data stream, called a semantic web. These streams and semantic links can then be used in conjunction with any business intelligence application to provide users to create analytical dashboards with minimal efforts.

With this approach, users are not required to create or load data explicitly from separate systems or business objects and can leverage the use of advanced analytics with the help of such seamless data streams from the semantic webs of insights. Users can view out-of-the-box insights as well as generate advanced analytics on such structured data.

Accordingly, in operation 850, the topic modelling server 140 creates a semantic web comprising the first set of data objects, the second set of data objects, and the third set of data objects. The semantic web comprises two or more data objects and/or insights and one or more semantic linkages among them. As an example, a topic is generated using machine learning for a "service ticket" data object. Example data structures for data objects and insights are shown below.

Ticket (Data Object) Data Structure:

```
{
    "ticketId": "",
    "ticketName": "",
    "ticketProcessor": "",
    "ticketDescription" : ""
}
```

Topic (Data Object) Data Structure:

```
{
    "topicId": "",
    "topicName": ""
}
```

An additional data structure is created to store relationships between topics and tickets.

Ticket Topic (Insight) Data Structure:

```
{
    "topicId": "topic id",
    "topicName": "Inferred Topic Name",
    "topicDetails": "Other Relevant Details",
    "ticket": "<LINK TO A TICKET DATA OBJECT>"
}
```

This data object is used to store information about the specific relationship between a ticket and a topic. A change in the ticket is reflected in the Ticket topic because the ticket data is referenced by a link to the Ticket data object. Additional data objects may be linked to this combination to provide more insights. For example, additional "account" and "email" data objects may be related to the ticket, the topic, or both.

Account (Data Object) Data Structure:

```
{
    "accountId": "",
    "accountName": "",
    "accountAddress": ""
}
```

The Ticket topic (insight) data structure may be updated as shown below.

Updated Ticket Topic (Insight) Data Structure:

```
{
    "topicId": "topic id",
    "topic": "Inferred Topic Details",
    "ticket": "<LINK TO A TICKET DATA OBJECT>",
    "account": "<LINK TO AN ACCOUNT DATA OBJECT>"
}
```

Thus, if either the ticket or the account is changed, the Ticket topic insight is also updated. Multiple insights may be created that each reference multiple other data objects, creating a web-like structure referred to as a "semantic web." The semantic web may be input to an analytical tool to generate additional results beyond what would be possible with the data objects without the insights.

Note that the same topic does not need to be "assigned" to multiple data objects. Instead, a topic usually may have a one-to-one relation with one data object entity directly. For instance, a topic would be assigned to a ticket. But, a ticket is linked to an account. An account is linked to another data object, and so on. Thus, the inter-object linkages, form a web-like structure, allowing for various possibilities of selection and organization. The semantic web may be provided to an analytical tool in operation 860.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: accessing, by one or more processors, a set of data objects, each data object comprising text; determining, by the one or more processors and using a machine learning model, based on the set of data objects, a topic for each data object; determining, by the one or more processors, based on the determined topics, relationships among the data objects; and providing, via a network, data representing the relationships among the data objects to an analytical tool.

In Example 2, the subject matter of Example 1, wherein at least a subset of the data objects represents service requests.

In Example 3, the subject matter of Examples 1-2, wherein the determining of the topic for each data object comprises providing the text for each data object to a natural language processor (NLP).

In Example 4, the subject matter of Examples 1-3 includes training the machine learning model using labeled data objects; wherein the determining of the topic for each data object comprises providing the text of the data objects to the trained machine learning model.

In Example 5, the subject matter of Examples 1-4, wherein the determining of the topic for each data object comprises: converting individual words of the text of each data object to vectors; combining the word vectors for each data object to generate a vector for the data object; and determining the topic for each data object based on the vector for the data object.

In Example 6, the subject matter of Examples 1-5, wherein the determining of the topic for each data object comprises: converting pairs of words of the text of each data object to bigram vectors; combining the bigram vectors for each data object to generate a vector for the data object; and determining the topic for each data object based on the vector for the data object.

In Example 7, the subject matter of Examples 1-6 includes using Latent Dirichlet Allocation to determine topics for the data objects.

Example 8 is a system comprising: a memory that stores instructions; and one or more processors configured by the instructions to perform operations comprising: accessing a set of data objects, each data object comprising text; determining, using a machine learning model and based on the set of data objects, a topic for each data object; determining, based on the determined topics, relationships among the data objects; and providing, via a network, data representing the relationships among the data objects to an analytical tool.

In Example 9, the subject matter of Example 8, wherein at least a subset of the data objects represent service requests.

In Example 10, the subject matter of Examples 8-9, wherein the determining of the topic for each data object comprises providing the text for each data object to a natural language processor (NLP).

In Example 11, the subject matter of Examples 8-10, wherein the operations further comprise: training the machine learning model using labeled data objects; wherein the determining of the topic for each data object comprises providing the text of the data objects to the trained machine learning model.

In Example 12, the subject matter of Examples 8-11, wherein the determining of the topic for each data object comprises: converting individual words of the text of each data object to vectors; combining the word vectors for each data object to generate a vector for the data object; and determining the topic for each data object based on the vector for the data object.

In Example 13, the subject matter of Examples 8-12, wherein the determining of the topic for each data object comprises: converting pairs of words of the text of each data object to bigram vectors; combining the bigram vectors for each data object to generate a vector for the data object; and determining the topic for each data object based on the vector for the data object.

In Example 14, the subject matter of Examples 8-13, wherein the operations further comprise: using Latent Dirichlet Allocation to determine topics for the data objects.

Example 15 is a non-transitory computer-readable medium that stores instructions that, when executed by one or more processors, cause the one or more processors to perform operations comprising: accessing a set of data objects, each data object comprising text; determining, using a machine learning model and based on the set of data objects, a topic for each data object; determining, based on the determined topics, relationships among the data objects; and providing data representing the relationships among the data objects to an analytical tool.

In Example 16, the subject matter of Example 15, wherein at least a subset of the data objects represents service requests.

In Example 17, the subject matter of Examples 15-16, wherein the determining of the topic for each data object comprises providing the text for each data object to a natural language processor (NLP).

In Example 18, the subject matter of Examples 15-17, wherein the operations further comprise: training the machine learning model using labeled data objects; wherein the determining of the topic for each data object comprises providing the text of the data objects to the trained machine learning model.

In Example 19, the subject matter of Examples 15-18, wherein the determining of the topic for each data object comprises: converting individual words of the text of each data object to vectors; combining the word vectors for each data object to generate a vector for the data object; and determining the topic for each data object based on the vector for the data object.

In Example 20, the subject matter of Examples 15-19, wherein the determining of the topic for each data object comprises: converting pairs of words of the text of each data object to bigram vectors; combining the bigram vectors for each data object to generate a vector for the data object; and determining the topic for each data object based on the vector for the data object.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 9:
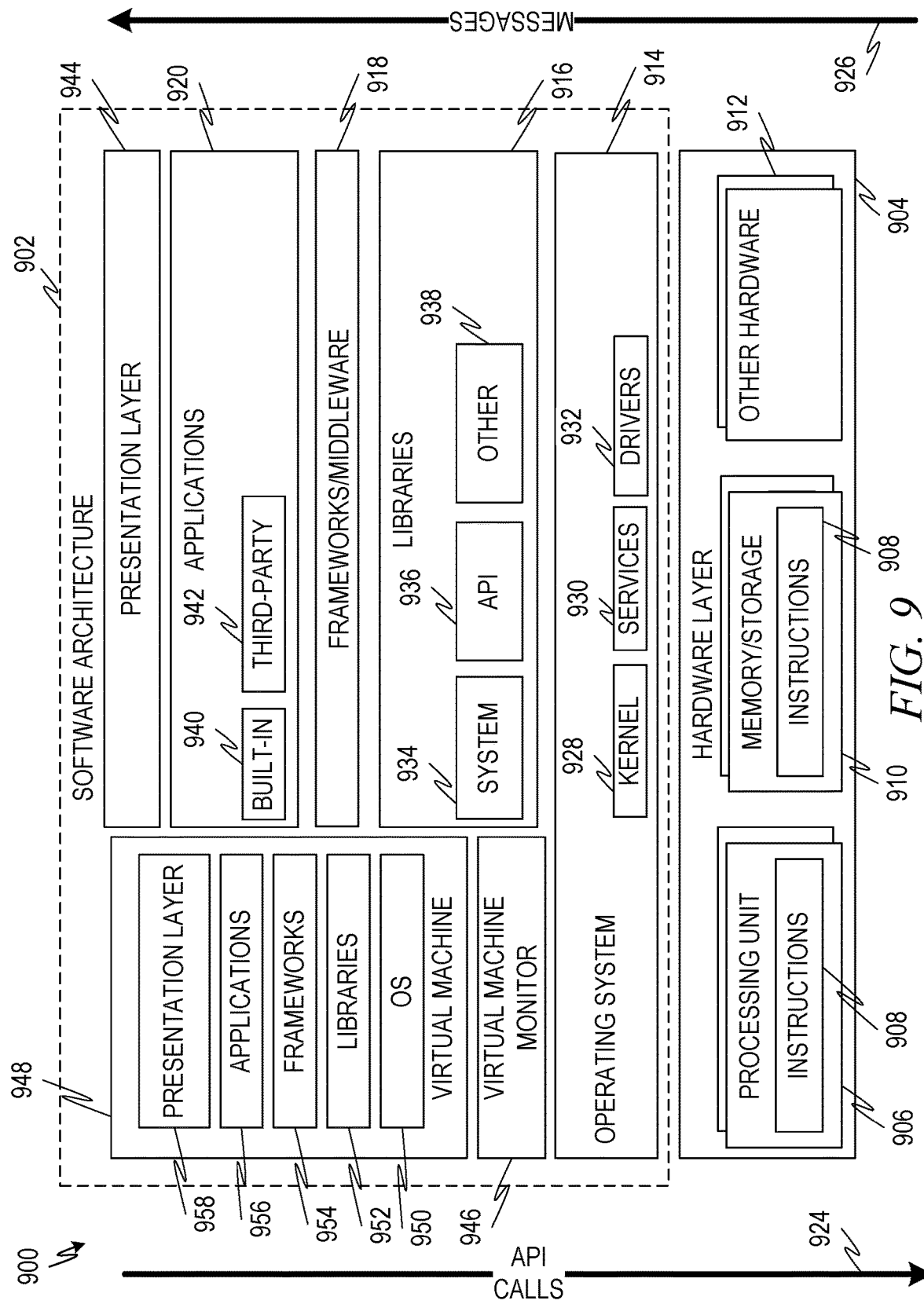
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 9.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 which represents any other hardware of the hardware layer 904, such as the other hardware illustrated as part of the software architecture 902.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 may provide a higher-level common infrastructure that may be utilized by the applications 920 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system libraries 934, API libraries 936, and other libraries 938), and frameworks/middleware 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
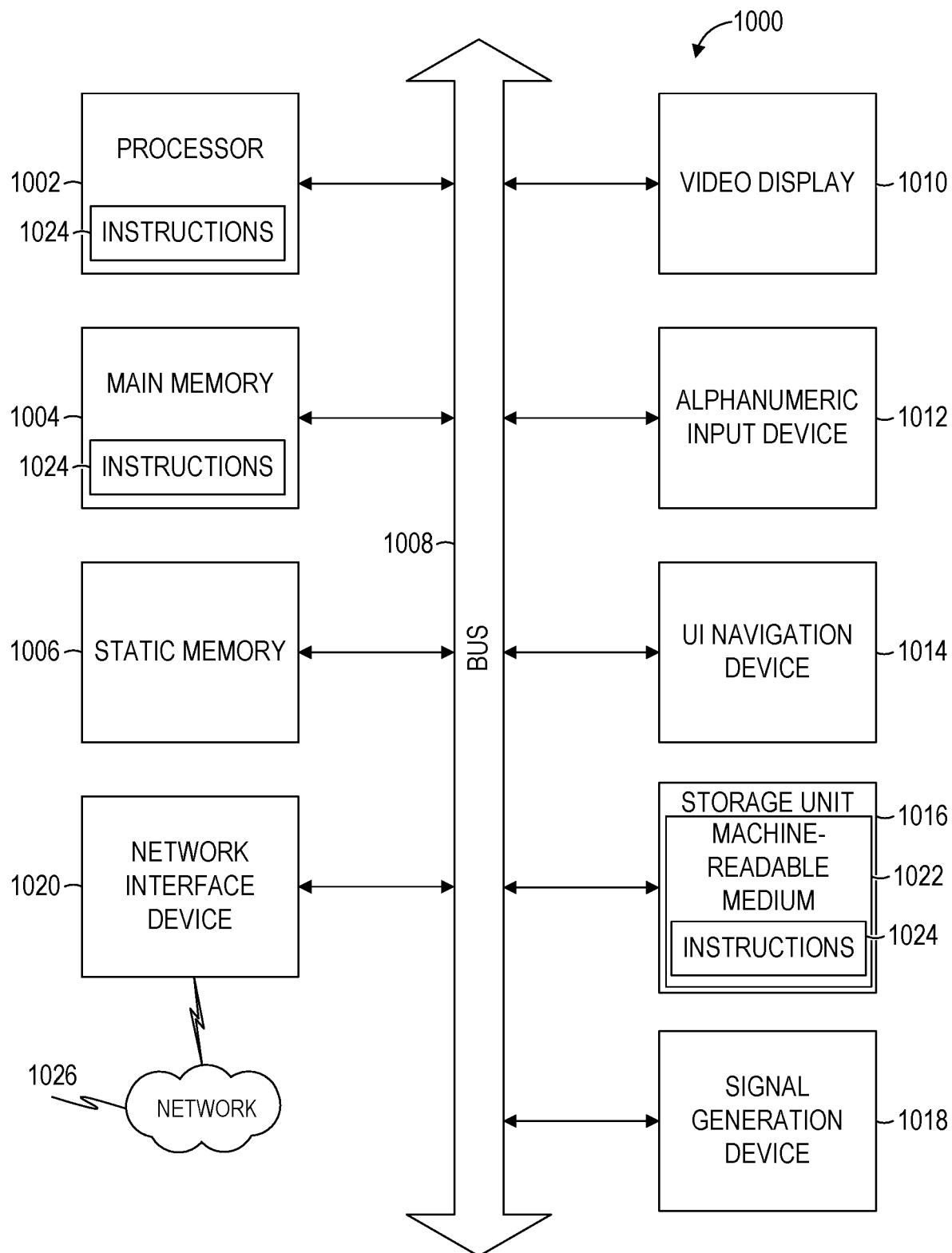
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a storage unit 1016, a signal generation device 1018 (e.g., a speaker), and a network interface device 1020.

Machine-Readable Medium

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1024 may further be transmitted or received over a communications network 1026 using a transmission medium. The instructions 1024 may be transmitted using the network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific example embodiments are described herein, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   accessing, by one or more processors, a set of data objects, each data object comprising text;
   converting individual words of the text of each data object to word vectors;
   combining the word vectors for each data object to generate a vector for the data object;
   determining, by the one or more processors and using a machine learning model, based on the vector for each data object of the set of data objects, a topic for the data object;
   determining, by the one or more processors, based on the determined topics, relationships among the data objects; and
   providing, via a network, data representing the relationships among the data objects to an analytical tool.

2. The method of claim 1, wherein at least a subset of the data objects represents service requests.

3. The method of claim 1, wherein the determining of the topic for each data object comprises providing the text for each data object to a natural language processor (NLP).

4. The method of claim 1, further comprising:
   training the machine learning model using labeled data objects;
   wherein the determining of the topic for each data object comprises providing the text of the data objects to the trained machine learning model.

5. The method of claim 1, further comprising using Latent Dirichlet Allocation to determine topics for the data objects.

6. A system comprising:
   one or more processors; and
   a memory that stores instructions that, when executed by the one or more processors, cause the one or more processors; to perform operations comprising:
      accessing a set of data objects, each data object comprising text;
      converting individual words of the text of each data object to word vectors;
      combining the word vectors for each data object to generate a vector for the data object;
      determining, using a machine learning model and based on the vector for each data object of the set of data objects, a topic for the data object;
      determining, based on the determined topics, relationships among the data objects; and
      providing, via a network, data representing the relationships among the data objects to an analytical tool.

7. The system of claim 6, wherein at least a subset of the data objects represent service requests.

8. The system of claim 6, wherein the determining of the topic for each data object comprises providing the text for each data object to a natural language processor (NLP).

9. The system of claim 6, wherein the operations further comprise:
   training the machine learning model using labeled data objects;
   wherein the determining of the topic for each data object comprises providing the text of the data objects to the trained machine learning model.

10. The system of claim 6, wherein the operations further comprise:
    using Latent Dirichlet Allocation to determine topics for the data objects.

11. A non-transitory computer-readable medium that stores instructions that, when executed by one or more processors, cause the one or more processors to perform operations comprising:
    accessing a set of data objects, each data object comprising text;
    converting individual words of the text of each data object to word vectors;
    combining the word vectors for each data object to generate a vector for the data object;

determining, using a machine learning model and based on the vector for each data object of the set of data objects, a topic for the data object;

determining, based on the determined topics, relationships among the data objects; and providing data representing the relationships among the data objects to an analytical tool.

12. The non-transitory computer-readable medium of claim 11, wherein at least a subset of the data objects represents service requests.

13. The non-transitory computer-readable medium of claim 11, wherein the determining of the topic for each data object comprises providing the text for each data object to a natural language processor (NLP).

14. The non-transitory computer-readable medium of claim 11, wherein the operations further comprise:

training the machine learning model using labeled data objects;

wherein the determining of the topic for each data object comprises providing the text of the data objects to the trained machine learning model.

15. The method of claim 1, further comprising:
fetching top keywords for each topic; and
providing a word cloud view based on a user-defined time frame.

16. The method of claim 1, wherein the text of each data object comprises a title and a body.

17. The system of claim 6, wherein the operations further comprise:
fetching top keywords for each topic; and
providing a word cloud view based on a user-defined time frame.

18. The system of claim 6, wherein the text of each data object comprises a title and a body.

19. The non-transitory computer-readable medium of claim 11, wherein the operations further comprise:
fetching top keywords for each topic; and
providing a word cloud view based on a user-defined time frame.

20. The non-transitory computer-readable medium of claim 11, wherein the text of each data object comprises a title and a body.

* * * * *